July 30, 1957 C. G. CROSSAN 2,800,737
LANDING NETS
Filed Feb. 23, 1955

INVENTOR.
CLIFFORD G. CROSSAN
BY
Martin E. Anderson
ATTORNEY

United States Patent Office 2,800,737
Patented July 30, 1957

2,800,737

LANDING NETS

Clifford G. Crossan, Denver, Colo.

Application February 23, 1955, Serial No. 490,047

3 Claims. (Cl. 43—12)

This invention relates to landing nets; and more particularly, to landing nets having a telescoping handle.

Most fishermen find that a landing net is an indispensible item of fishing equipment if they do not wish to lose many of the fish they have hooked. The conventional landing nets are made in many different sizes, shapes and lengths to suit the needs of a particular type of fishing or the preference of the fisherman himself. A serviceable landing net must be rugged although lightweight so that it may be easily transported. Also, certain types of fishing require a landing net with a long handle; such as, for example, fishing from a boat in order that the fish may be netted without lifting it from the water. The overall length of the conventional long-handled landing nets is so great, however, that they become a nuisance to store and carry. In addition, a fisherman may encounter conditions requiring both a long and a short handle landing net in the same general area.

It is, therefore, the principal object of the present invention to provide a landing net having a telescoping handle which enables it to be used either as a short or a long-handled landing net.

A second object of the invention is the provision of a landing net which is rugged although light in weight.

Additional objects of the invention are the provision of a landing net which is simple to operate, easily stored and carried, and inexpensive.

Other objects will be in part apparent and in part pointed out specifically hereinafter in connection with the description of the drawing which follows, and in which.

Figure 1:
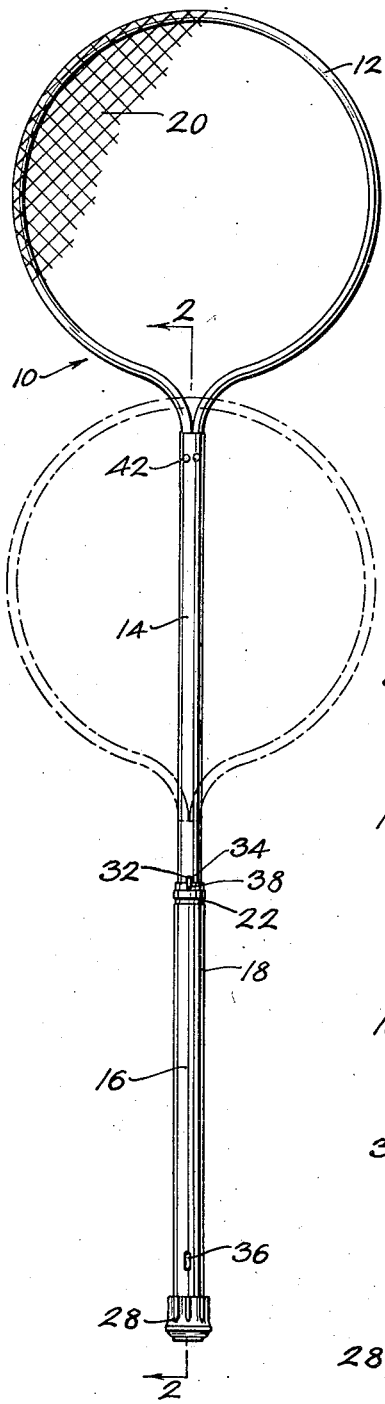
Figure 1 is a plan view of the landing net of the present invention showing the extended position of the handle in full lines and the retracted position in dotted lines.

Referring now in particular to Figure 1 of the drawing, reference numeral 10 indicates the landing net of the present invention in a general way and shows the hoop 12 thereof attached to the forward end of inner tubular element 14. Inner tubular element 14 is mounted for telescoping movement within outer tubular element 16. The outer and inner tubular elements combine to form the telescoping handle 18 of the landing net. Hoop 12 is provided with a conventional net 20 prior to being attached to the inner tubular element. The inner and outer tubular elements of the handle are releasably locked together against both relative axial and rotational movement in the extended position thereof shown by full lines in Figure 1; and also, the retracted position shown by the dotted lines. Hence, the hoop which is rigidly attached to the inner tubular element cannot rotate relative to the outer tubular element in either the extended or retracted position. The landing net can, of course, be used with the handle extended or retracted depending upon the particular conditions under which it is needed. The hoop and tubular elements are preferably formed of tubular aluminum because of its light weight and strength.

Figure 2:
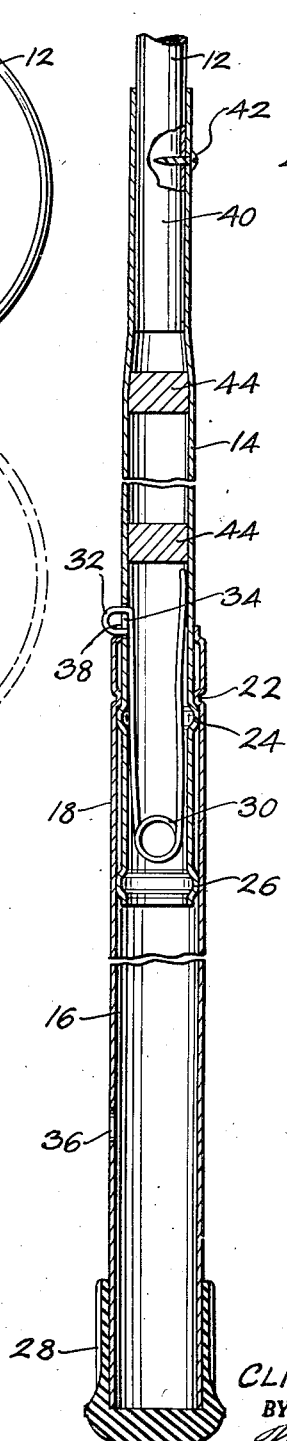
Figure 2 is a section of the handle taken along line 2—2 of Figure 1.

As will be seen in Figure 2 the outside diameter of the inner tubular element is slightly less than the inside diameter of the outer tubular element. An annular stop 22 is integrally formed adjacent the forward end of the outer tubular element with the inside diameter thereof approximately the same as the outside diameter of the inner tubular element. A corresponding integral annular stop 24 on the inner tubular element spaced from the rear end thereof extends outwardly therefrom in position to engage element 22 to stop the tubular elements in extended position. The rear end of the inner tubular element is provided with an integral annular bearing 26 sized and adapted to slide along the inside surface of the outer tubular element. The rear end of the outer tubular element is provided with a cap 28. Stop 22 of the outer tubular element and annular bearing 26 of the inner tubular element co-act to prevent the inner element from wabbling with respect to the outer.

A safety pin type spring 30 is carried inside the rear end of the inner tubular element. Spring 30 is provided with a tit 32 positioned to be urged outwardly through slot 34 in the wall of the inner tubular element. A slot 36 is provided in the outer tubular element in position to receive the tit 32 of the spring when the tubular elements are rotated relative to one another in retracted position. The tit passing into slot 34 locks the tubular elements together and prevents further axial or rotational movement therebetween. The forward end of the outer tubular element is provided with a notch 38 to receive the tit upon relative rotation of the tubular elements in extended position with the annular stops in engagement with one another.

The tit positioned in notch 38 prevents relative rotational and axial movement between the tubular elements when in extended position. Release of the tubular elements is accomplished by merely manually pressing the tit until it no longer locks within slot 36 or notch 38.

Figure 3:
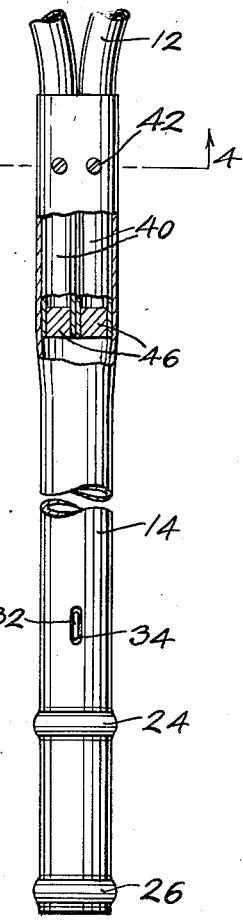
Figure 3 is a plan view of the inner tubular element of the handle, a portion of which has been broken away to expose the free ends of the hoop; and, Figure 4 is a section taken along line 4—4 of Figure 3.
Figure 4:
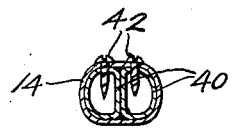

Referring now to Figures 2, 3 and 4 wherein is shown the manner in which the hoop is attached to the inner element, it will be seen that the free ends 40 of the hoop are passed into the forward end of the inner tubular element. The free ends of the hoop are then removably attached to the inner tubular element by means of suitable fasteners 42.

Inner tubular element 14 is provided with plugs 44 adjacent each end thereof; and, the free ends of hoop 12 are provided with plugs 46 to prevent water from entering the handle and hoop which would materially increases the weight of the landing net.

From the foregoing description of the landing net of the present invention it will be seen that the many useful objects for which it was designed have been achieved; and, therefore, I claim:

1. A landing net comprising: a hoop; a net suspended from the hoop; a handle attached to the hoop, the handle having an inner and outer tubular element mounted for relative telescopic movement, the inside diameter of the outer tubular element being slightly greater than the outside diameter of the inner tubular element, the inside surface of the outer tubular element and the outside surface of the inner tubular element having integral annular stops positioned and adapted to engage one another and stop the tubular elements in extended position, the annular stop on the inner tubular element being spaced from the rear end thereof, the inner tubular element having an integral annular bearing adjacent the rear end thereof adapted to slide along the inside surface of the outer tubular element, the annular bearing on the inner tubular element and the annular stop on the outer tubular element co-acting to prevent the inner tubular element from wabbling within the outer tubular element; and a safety pin type spring carried within the rear end of the inner tubular element, one arm of the spring having a tit thereon urged against the inner wall of the inner tubular element; the inner tubular element having an opening to receive the tit on the spring; and, the outer tubular element having an opening at the rear end to receive the tit when the tubular elements are in retracted position, and an opening at the forward end to receive the tit when the tubular elements are in extended position, the tit forming means for releasably locking the tubular elements together against relative rotational and telescopic movement in either the extended or retracted position.

2. A device in accordance with claim 1 in which: the inner tubular element is provided with water-tight plugs positioned in opposite ends thereof; and, the outer tubular element is provided with a water-tight cap fitted over the rear end thereof, the cap and plugs acting to prevent water from entering the handle and increasing the weight of the landing net.

3. A device in accordance with claim 1 in which: the hoop comprises a tube bent into the form of a circle, the ends of the tube being bent into parallel contacting relation and attached within the forward end of the inner tubular element; the inner tubular element is provided with water-tight plugs positioned in opposite ends thereof; the ends of the hoop are provided with water-tight plugs; and, the rear end of the outer tubular element is provided with a water-tight cap, the cap and plugs acting to prevent water from entering the handle and hoop to increase the weight of the landing net.

References Cited in the file of this patent

UNITED STATES PATENTS

| | | |
|---|---|---|
| 273,279 | Hosea | Mar. 6, 1883 |
| 367,928 | Reed | Aug. 9, 1887 |
| 752,550 | Heritage | Feb. 16, 1904 |
| 1,276,780 | Lucas | Aug. 27, 1918 |
| 1,792,714 | Shields | Feb. 17, 1931 |
| 2,288,353 | Hiatt | June 30, 1942 |

FOREIGN PATENTS

| | | |
|---|---|---|
| 13,294 | Great Britain | 1904 |